United States Patent
Ochiai et al.

(10) Patent No.: US 10,983,202 B2
(45) Date of Patent: Apr. 20, 2021

(54) SENSOR ASSEMBLY AND MOUNTING METHOD THEREFOR

(71) Applicant: NIFCO, INC., Yokosuka (JP)

(72) Inventors: Hiroshi Ochiai, Kanagawa (JP); Tomoharu Izume, Kanagawa (JP)

(73) Assignee: NIFCO INC., Yokosuka (JP)

( * ) Notice: Subject to any disclaimer, the term of this patent is extended or adjusted under 35 U.S.C. 154(b) by 0 days.

(21) Appl. No.: 16/954,663

(22) PCT Filed: Dec. 19, 2018

(86) PCT No.: PCT/JP2018/046768
§ 371 (c)(1),
(2) Date: Jun. 17, 2020

(87) PCT Pub. No.: WO2019/131375
PCT Pub. Date: Jul. 4, 2019

(65) Prior Publication Data
US 2020/0309928 A1    Oct. 1, 2020

(30) Foreign Application Priority Data
Dec. 25, 2017  (JP) .............................. JP2017-248466

(51) Int. Cl.
*G01S 7/52* (2006.01)
*H01L 41/053* (2006.01)
(Continued)

(52) U.S. Cl.
CPC ................ *G01S 7/521* (2013.01); *F16B 5/07* (2013.01); *G01S 15/93* (2013.01)

(58) Field of Classification Search
CPC ....... H01L 41/1132; H01L 41/053; G01S 7/521
(Continued)

(56) References Cited

U.S. PATENT DOCUMENTS 7,591,182 B2   9/2009   Yoshihisa et al.
7,628,076 B2   12/2009  Nakano et al.
(Continued)

FOREIGN PATENT DOCUMENTS

JP    S62240890 A    10/1987
JP    H09500448 A    1/1997
(Continued)

OTHER PUBLICATIONS

English translation of International Search Report for International Application No. PCT/JP2018/046768, dated Mar. 26, 2019, 2 pages.
(Continued)

*Primary Examiner* — Derek J Rosenau
(74) *Attorney, Agent, or Firm* — Armstrong Teasdale LLP

(57) ABSTRACT

Provided is a sensor part having a vibrating member and a mounting method therefor that allows the sensor part to be mounted to a target member such as a bumper in a simple, efficient and reliable manner. The sensor part includes a first assembly (3) including a tubular first case (5), a vibrating member (7) temporarily retained by the first case, and a pressing member (12) slidably supported in the first case, and a second assembly (4) including a second case (34) to be connected to the first case, and a circuit board (35) for controlling the vibrating member. After the first case is fixed to the target member, the pressing member is pushed so as to release the vibrating member from the temporal retention, and press the vibrating member against the target member.

12 Claims, 14 Drawing Sheets

(51) Int. Cl.
     *G01S 7/521*     (2006.01)
     *F16B 5/07*     (2006.01)
     *G01S 15/93*     (2020.01)

(58) Field of Classification Search
     USPC .................................... 310/338, 339, 348
     See application file for complete search history.

(56)                    References Cited

U.S. PATENT DOCUMENTS

| | | |
|---|---|---|
| 8,794,071 B2 | 8/2014 | Inoue et al. |
| 2014/0062260 A1* | 3/2014 | Tsai .................... H01L 41/1132 |
| | | 310/334 |

FOREIGN PATENT DOCUMENTS

| | | |
|---|---|---|
| JP | 2007114182 A | 5/2007 |
| JP | 2007155675 A | 6/2007 |
| WO | 2011089644 A1 | 7/2011 |
| WO | 2012120354 A1 | 9/2012 |
| WO | 2016175327 A1 | 11/2016 |
| WO | 2016204295 A1 | 12/2016 |

OTHER PUBLICATIONS

Decision to Grant JP Patent Application No. 2018-566992 drafted Nov. 26, 2019; 2 pp.
Notice of Reasons for Refusal for JP Application No. 2018-566992 drafted Jul. 25, 2019; 3 pp.
German Office Action for DE Application 112018006589.8; 11 pp.

\* cited by examiner

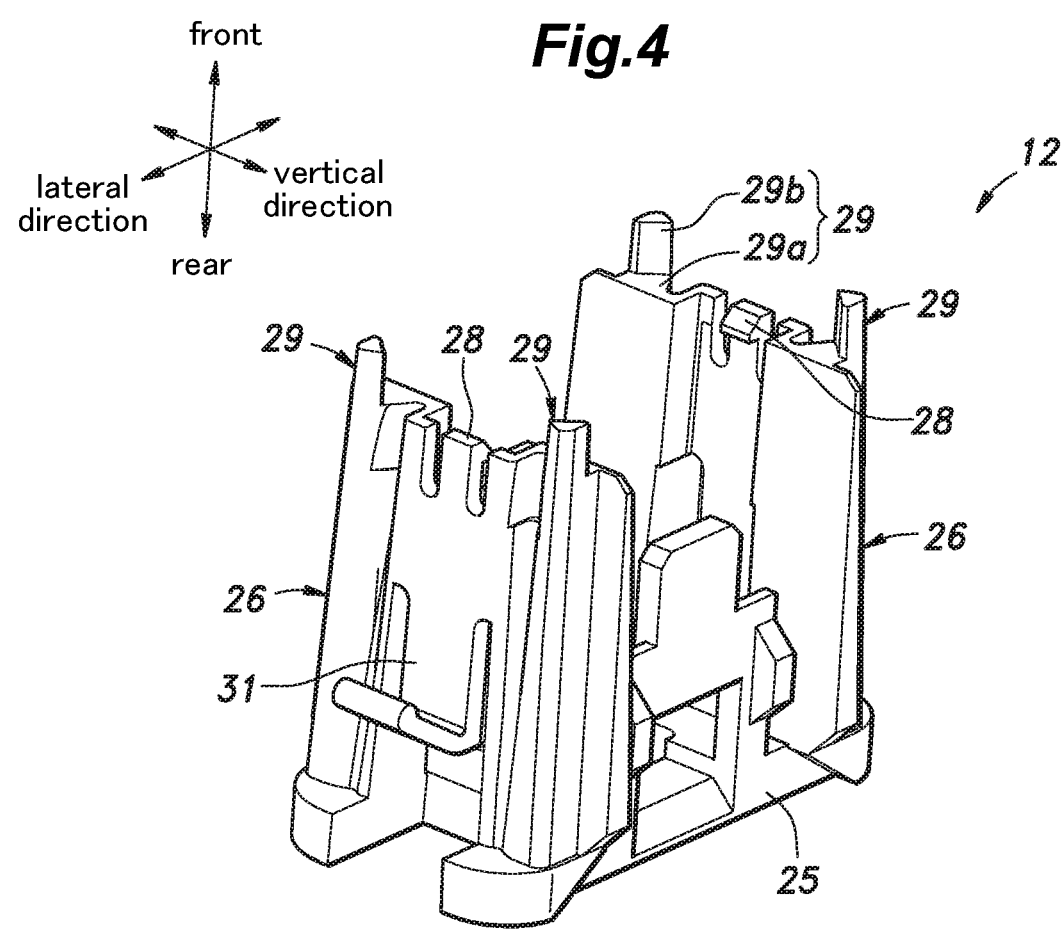

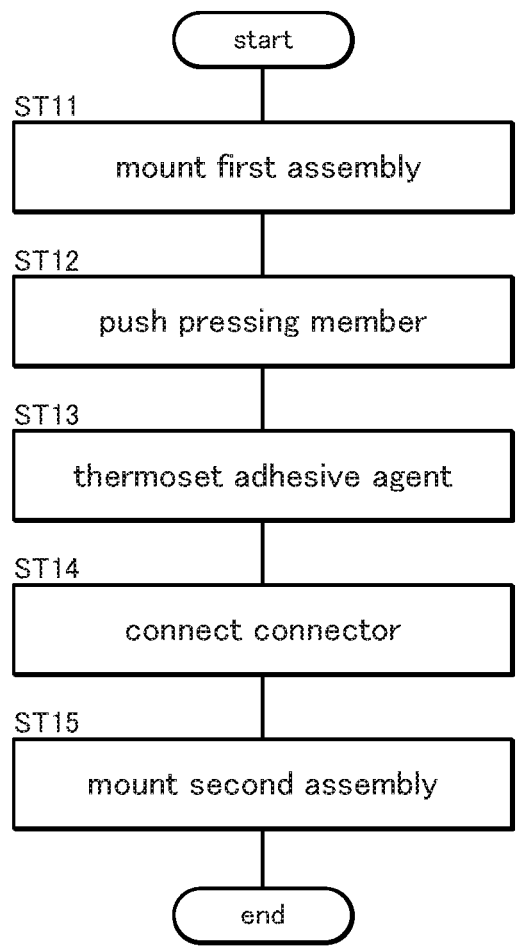

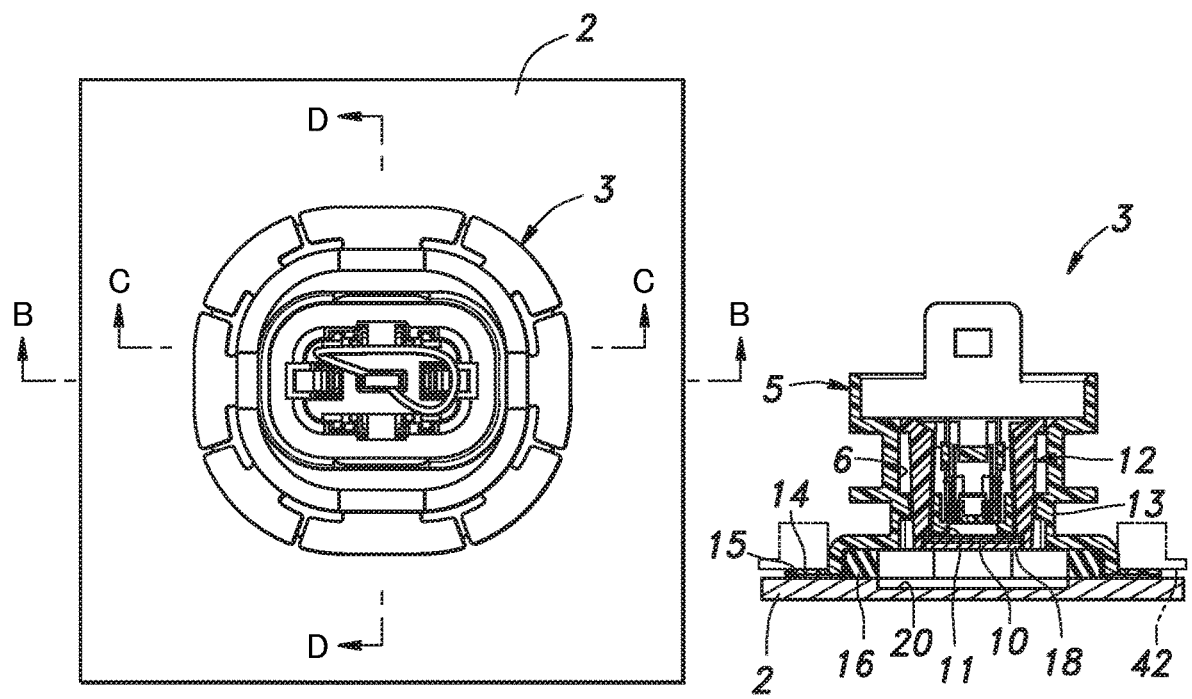
Fig.6A
Fig.6C
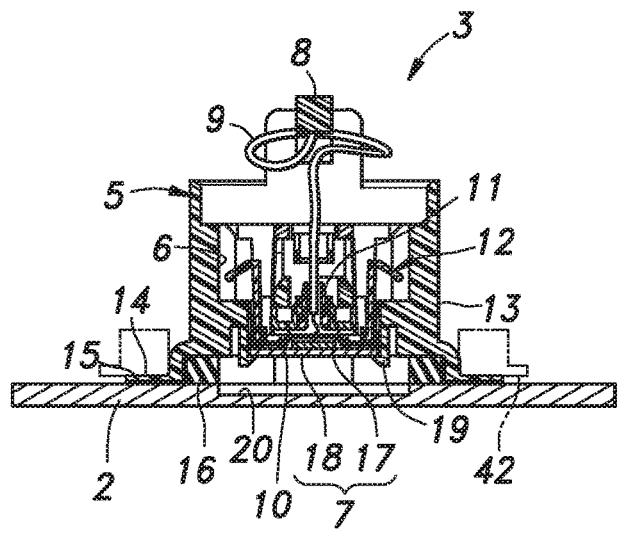
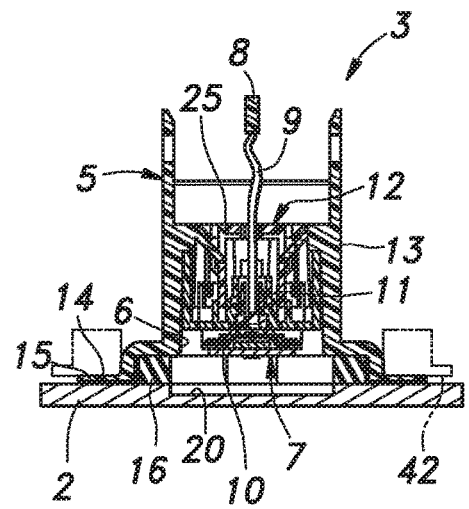
Fig.6B
Fig.6D

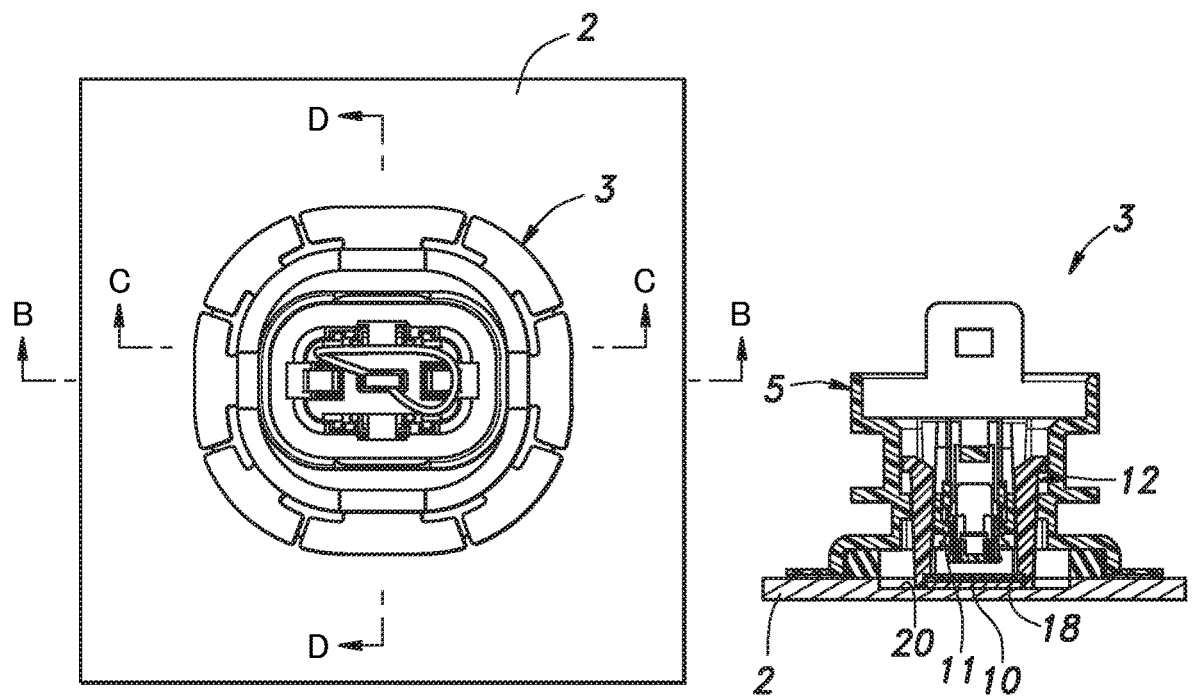
*Fig.7A*
*Fig.7C*
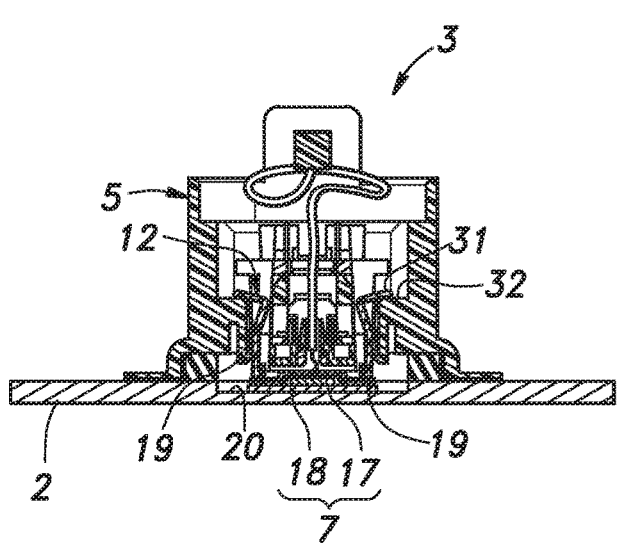
*Fig.7B*
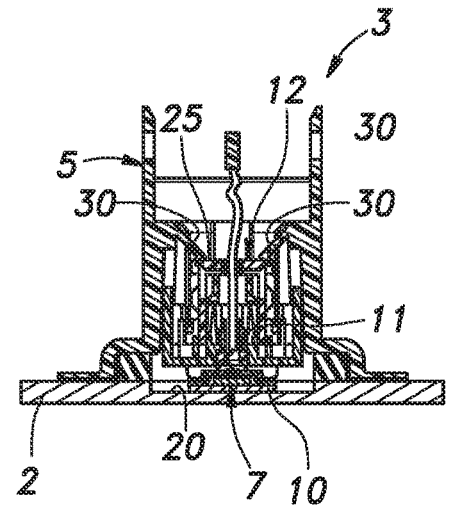
*Fig.7D*

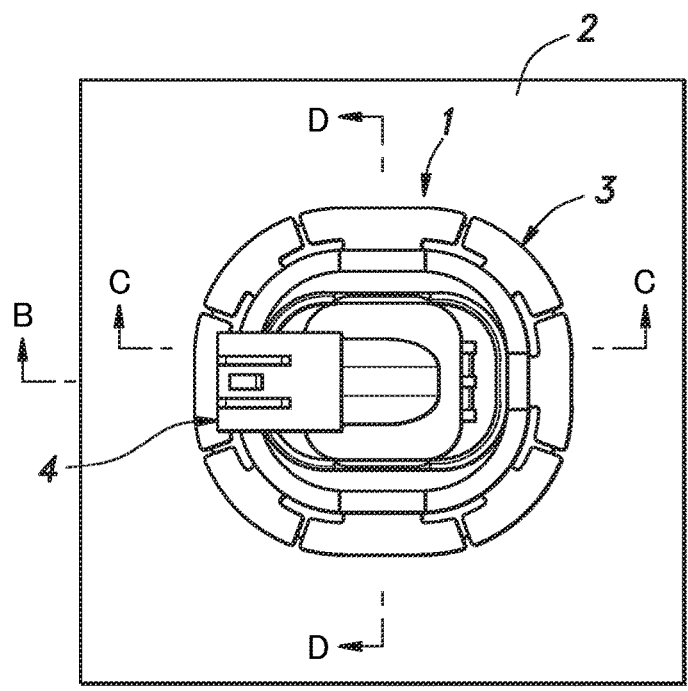
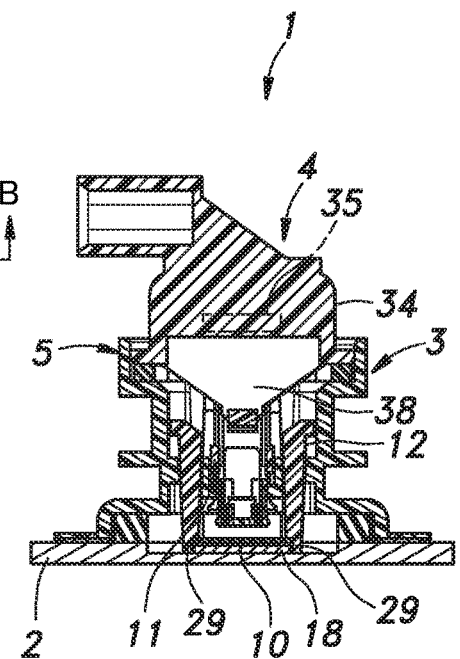
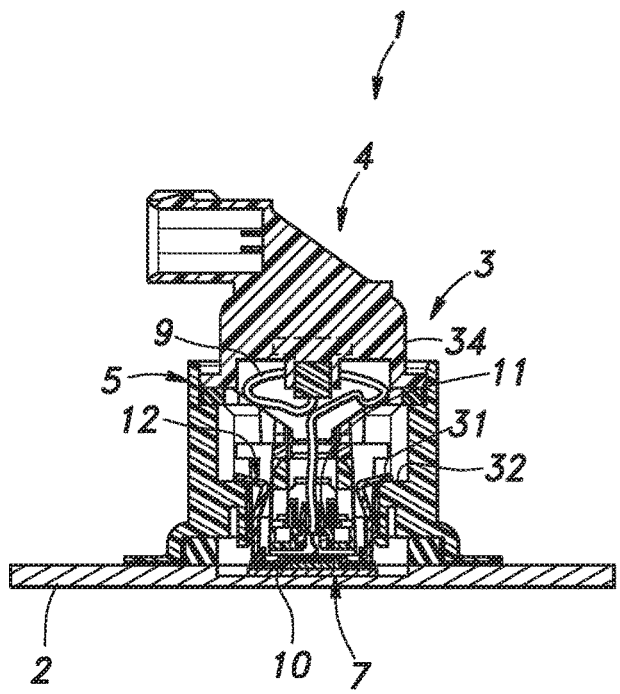
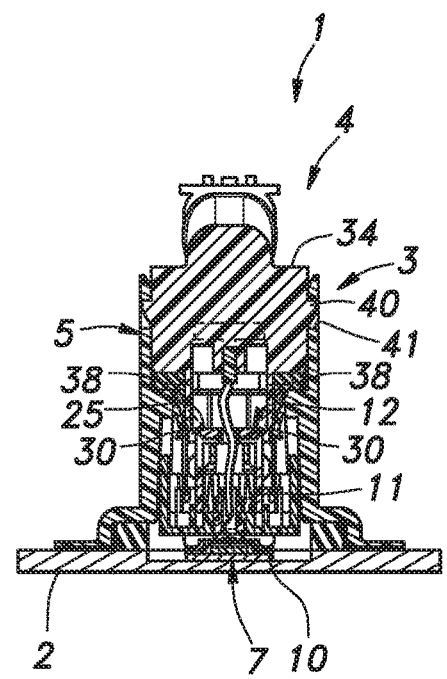
*Fig.9A*
*Fig.9C*
*Fig.9B*
*Fig.9D*

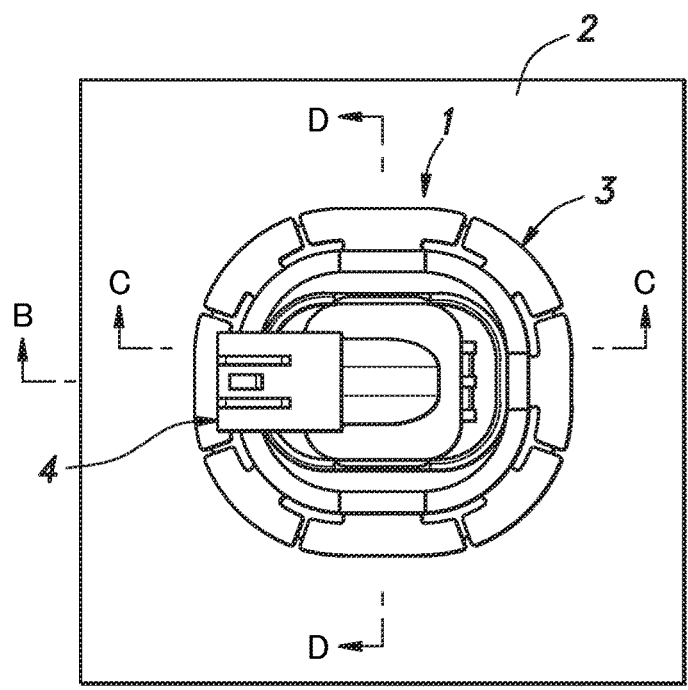
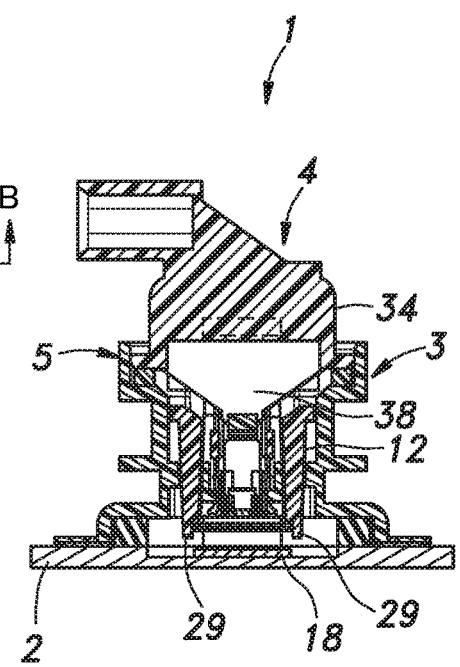
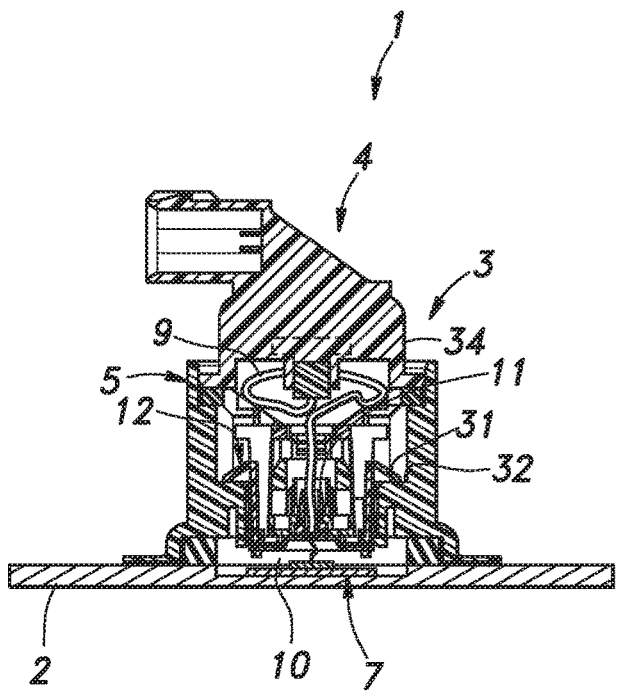
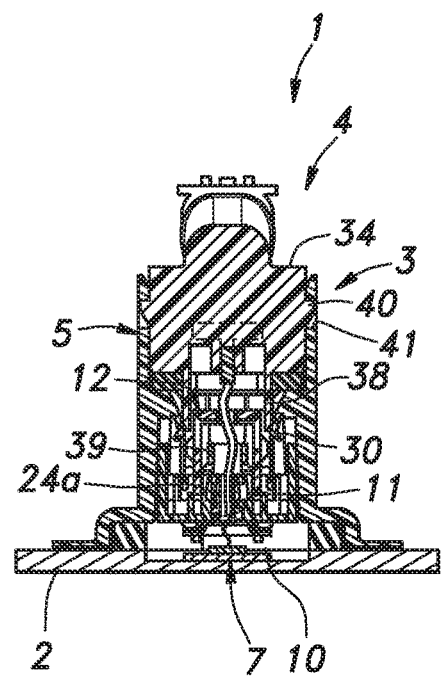
Fig.10A
Fig.10C
Fig.10B
Fig.10D

US 10,983,202 B2

SENSOR ASSEMBLY AND MOUNTING METHOD THEREFOR

CROSS-REFERENCE TO RELATED APPLICATIONS

This application is a U.S. National Phase Application of PCT/JP2018/046768, filed Dec. 19, 2018, which claims the benefit of priority to Japanese Patent Application No. 2017-248466, filed Dec. 25, 2017. The entire content of these applications is hereby expressly incorporated by reference.

TECHNICAL FIELD

The present disclosure relates to a sensor part having a vibrating member to be fixed to a bumper or any other member of a vehicle, and a mounting method therefor.

BACKGROUND ART

A sensor may be attached to the vehicle for the purpose of driving assistance or autonomous driving of the vehicle. An ultrasonic sensor attached to a bumper or the like detects an obstacle or the like by causing a vibrating member to generate an ultrasonic wave and detecting a reflected wave. A hole may be made in the bumper so that the vibrating member may be fitted in the hole, and associated component parts may be placed on the back side of the bumper. However, if the vibrating member is exposed to the outside in this way, the external appearance may be impaired. Therefore, for example, Patent Document 1 discloses an ultrasonic sensor having a vibrating member secured to the back surface of the bumper so that the ultrasonic waves may be transmitted and received through the bumper.

PRIOR ART DOCUMENT(S)

Patent Document(s)

Patent Document 1: JPS62-240890A

SUMMARY OF THE INVENTION

Task to be Accomplished by the Invention

However, according to the sensor disclosed in Patent Document 1, the vibrating member and a case for protecting the vibrating member are required to be individually positioned and attached to the back side of the bumper, and components such as the circuit board for controlling the vibrating member are required to be attached to the vehicle body or the bumper so that the assembly work is highly complex. In view of such a problem of the prior art, a primary object of the present invention is to provide a sensor part having a vibrating member and a mounting method therefor that allow the sensor part to be mounted to a target member such as a bumper in a simple, efficient and reliable manner without requiring to form a hole in the bumper or the like.

Means to Accomplish the Task

At least some of the embodiments of the present invention is characterized by a sensor part including a vibrating member (7) to be brought into close contact with a target member (2), and a case (33, 60) for at least partly covering the vibrating member, the sensor part further comprising: a first assembly (1. 51) provided with the vibrating member, and a first case (5. 55) forming at least a part of a case, and having a temporary retaining portion (19) configured to retain the vibrating member in a selectively releasable manner, and a fixing portion (14) configured to be fixed to the target member; and a second assembly (4, 54) provided with a circuit board (35) electrically connectable to the vibrating member to control the vibrating member.

According to this arrangement, once either one of the first case and the vibrating member retained by the temporary retaining portion is properly positioned, the positioning of the other is not required, so that the mounting process is both simple and efficient. In addition, since the fixing operation of the first case and the fixing operation of the vibrating member to the target member can be performed separately, the first case and the vibrating member can be fixed more reliably than in the case where they are fixed at the same time.

According to at least some of the embodiments of the present invention, the first case includes a tubular member having two open ends and formed with the fixing portion at one of the ends thereof, and the vibrating member is positioned in a hollow interior portion of the first case by the temporary retaining portion formed on an inner surface of the first case.

Thereby, the vibrating member can be protected by the first case before the mounting process.

According to at least some of the embodiments of the present invention, in the sensor part (1), the first assembly (3) further includes a pressing member (12) positioned in the tubular hollow interior portion (6) of the first case so as to be slidable in an axial direction of the first case, the pressing member being moveable from a pressing position where the vibrating member when released from the temporary retaining portion is pressed against the target member with a prescribed pressure to a separated position where the pressing member is spaced from the vibrating member.

Since the vibrating member can be moved from the state of being retained by the temporary retaining portion to the state of being pressed against the target member by pushing the pressing member, the fixing operation of the vibrating member is simplified. Further, since the pressing member can be displaced to a position separated from the vibrating member after the vibrating member is fixed, the vibration of the vibrating member is not hindered when the sensor is in use.

According to at least some of the embodiments of the present invention, the first case is provided with a pressing engagement portion (30) for engaging the pressing member at the pressing position in a selectively releasable manner, and wherein the pressing member is provided with a biasing portion (31) for biasing the pressing member engaged by the pressing engagement portion toward the separated position.

Thus, simply by releasing the engagement of the pressing member by the pressing engagement portion, the pressing member can be separated from the vibrating member so that the assembly work is facilitated.

According to at least some of the embodiments of the present invention, the second assembly (4) further includes a second case (34) supporting the circuit board and configured to be joined to the first case to form the case (33) in cooperation with the first case, the pressing engagement portion includes a pressing engagement claw (30) projecting from an inner surface of the first case to engage the first pressing portion, and the second case is provided with a release portion (38) configured to push the pressing engagement claw outward so as to release the pressing member from the pressing engagement claw when the second case is joined to the first case.

Since the pressing member can be separated from the vibrating member by the operation of attaching the second assembly to the first assembly, the attaching operation is made both simple and efficient. In addition, since the position of the circuit board is determined simply by attaching the second case to the first case, the positioning of the printed circuit board is not necessary, and the attaching operation is made both simple and efficient.

According to at least some of the embodiments of the present invention, the second case closes the other end of the first case.

Since the vibrating member is covered by the target member and the case, the vibrating member can be protected in a highly reliable manner.

According to at least some of the embodiments of the present invention, the first case is provided with a first seal member (16) having a resiliency and extending along the fixing portion to be interposed between the first case and the target member when the first case is fixed to the target member, and the first case or the second case is provided with a second seal member (36) having a resiliency and extending along a joining face of the first case or the second case to be interposed between the first case and the second case when the second case is connected to the first case.

The first seal member and the second seal member thus keep the case watertight, protect the diaphragm and the electrical connection portion disposed in the case, and suppress the propagation of the vibration. Thus, the printed circuit board supported by the second case is favorably protected.

According to at least some of the embodiments of the present invention, the first assembly includes a wire harness connected to the vibrating member and configured to be connected to the circuit board.

Since the vibration of the vibrating member is absorbed by the wire harness, the printed circuit board can be protected from the vibration.

At least some of the embodiments of the present invention is characterized by a method for mounting a sensor part (1, 51) including a first assembly (3, 53) provided with a vibrating member (7) configured to be brought into close contact with a target member (2), and a first case (5, 55) having a temporary retaining portion (19) configured to retain the vibrating member in a selectively releasable manner, and a fixing portion (14) configured to the fixed to the target member; and a second assembly (4, 54) provided with a second case (34, 61) configured to be connected to the first case to form a case (33, 60) in cooperation with the first case, and a circuit board (35) electrically connectable to the vibrating member to control the vibrating member;

the method comprising the steps of:

attaching the first assembly to the target member by fixing the first case to the target member (ST11, ST21);

releasing the vibrating member from the temporary retaining portion to be pressed against the target member (ST12, ST22);

bringing the vibrating member into a close contact with the target member (ST13, ST23, ST24);

electrically connecting the vibrating member to the circuit board (ST14, ST25); and joining the second assembly to the first assembly by connecting the second case to the first case (ST15, ST26).

Thereby, once the first case is positioned, there is no need to position the vibrating member, and once the second case is connected to the first case, the circuit board is automatically positioned. Therefore, the mounting operation is both simple and efficient. In addition, since the fixing operation of the first case and the vibrating member to the target member can be performed separately, the first case and the vibrating member can be fixed more reliably as compared to the case where they are fixed at the same time.

According to at least some of the embodiments of the present invention, in this mounting method for a sensor part (1), the first case (5) is tubular in shape and has two open ends, the temporary retaining portion is formed on an inner surface of the first case, the first assembly (3) further includes a pressing member (12) supported by the first case so as to be slidable in an axial direction of the first case, the pressing member is movable from an initial position to a pressing position where the vibrating member released from the temporary retaining portion is pressed against the target member with a prescribed pressure, and to a separated position where the pressing member is spaced from the vibrating member, in a sequential manner, the pressing member is biased away from the vibrating member at the pressing position, and engaged by a pressing engagement claw (30) projecting from an inner surface of the first case so as to prevent a movement of the pressing member away from the vibrating member, the pressing step (ST12) includes pushing the pressing member to move from the initial position to the pressing position, and the step of joining the second assembly to the first assembly (ST15) includes moving the pressing member from the pressing position to the separated position by causing a release portion (38) provided on the second case to push the pressing engagement claw outward so as to disengage the pressing member from the pressing engagement claw when the second case is being connected to the first case.

Thereby, the vibrating member can be pressed against the target member by pushing the pressing member, and the pressing member can be separated from the vibrating member by the operation of connecting the first case to the second case so that the mounting work can be made both simple and efficient.

According to at least some of the embodiments of the present invention, in this mounting method for a sensor part (51), the first case (55) is tubular in shape and has two open ends, the vibrating member retained by the temporary retaining portion is located in a hollow interior portion (56) of the first case, and the pressing step (ST22) includes inserting a jig (52) into the hollow interior portion of the first case to push out the vibrating member to be disengaged from the temporary retaining portion and pressed against the target member.

Thereby, the structure of the sensor part is simplified as compared to the case where the pressing member is used.

According to at least some of the embodiments of the present invention, in this mounting method for a sensor part (51), the step of bringing the vibrating member into a close contact with the target member includes heating a thermosetting resin interposed between the vibrating member and the target member via the jig (ST23), and pulling out the jig after thermosetting the thermosetting resin (ST24).

Since the jig serves as a means for pressing the vibrating member and a means for thermosetting the thermosetting bonding agent. the work efficiency is improved.

The present invention thus provides a sensor part provided with a vibrating member that can be mounted to a target member in a both simple and reliable manner without forming a hole in the target member.

BRIEF DESCRIPTION OF THE DRAWING(S)

FIG. 4 is a perspective view of a pressing member of the first embodiment;

FIG. 5 is a flowchart showing a procedure for mounting the sensor part of the first embodiment;

FIG. 6 shows various views illustrating the procedure for mounting the sensor part of the first embodiment (A: plan view, B: sectional view taken along line B-B in FIG. 6A, C: sectional view taken along line C-C in FIG. 6A, D: sectional view taken along line D-D in FIG. 6A);

FIG. 7 shows various views illustrating the procedure for mounting the sensor part of the first embodiment (A: plan view, B: sectional view taken along line B-B in FIG. 7A, C: sectional view taken along line C-C in FIG. 7A, D: sectional view taken along line D-D in FIG. 7A);

FIG. 9 shows various views illustrating the procedure for mounting the sensor part of the first embodiment (A: plan view, B: sectional view taken along line B-B in FIG. 9A, C: sectional view taken along line C-C in FIG. 9A, D: sectional view taken along line D-D in FIG. 9A);

FIG. 10 shows various views illustrating the procedure for mounting the sensor part of the first embodiment (A: plan view, B: sectional view taken along line B-B in FIG. 10A, C: sectional view taken along line C-C in FIG. 10A, D: sectional view taken along line D-D in FIG. 10A);

DESCRIPTION OF THE PREFERRED EMBODIMENT(S)

Figure 1:
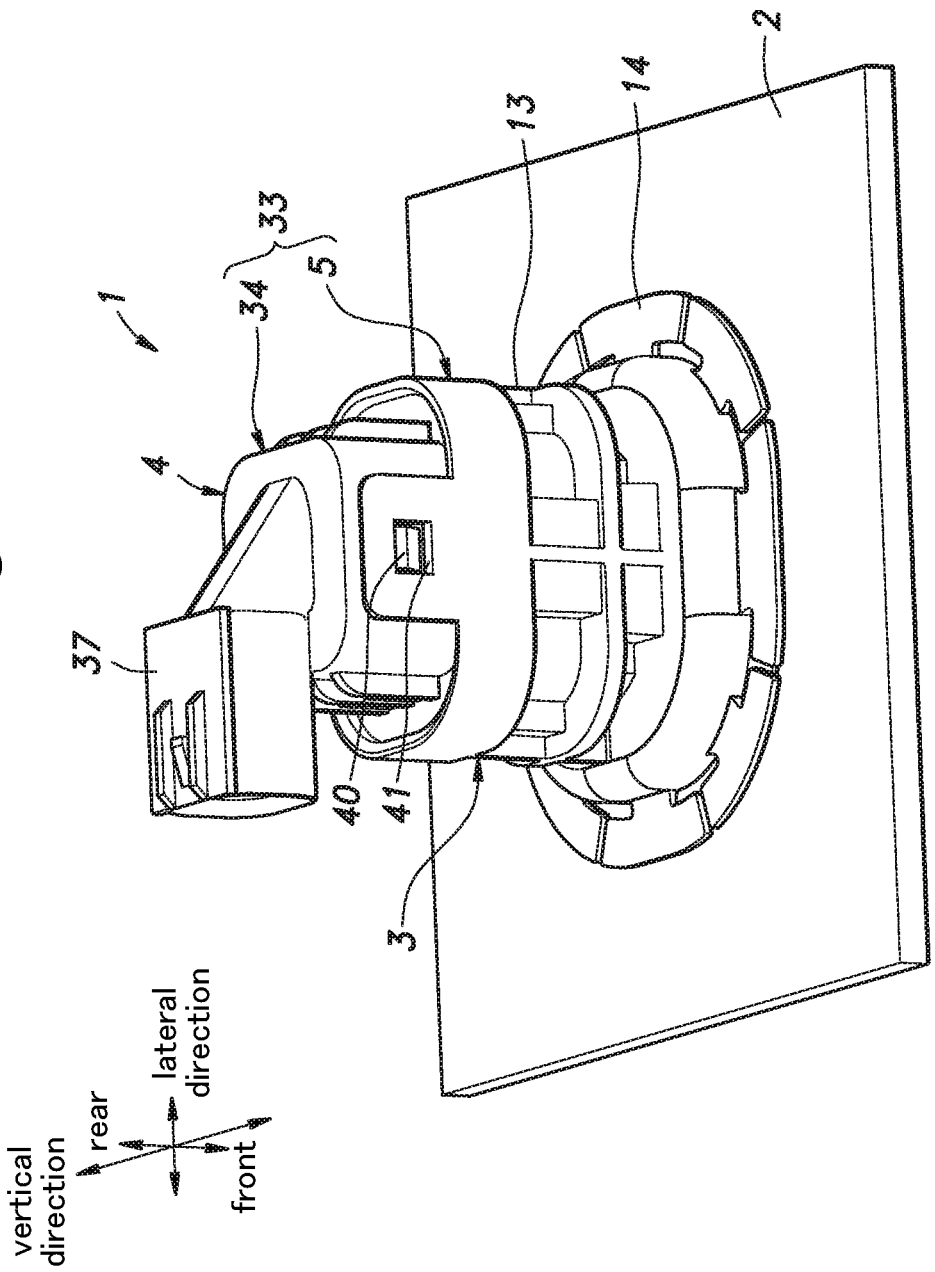
FIG. 1 is a perspective view of the sensor part according to a first embodiment of the present invention.
Figure 2:
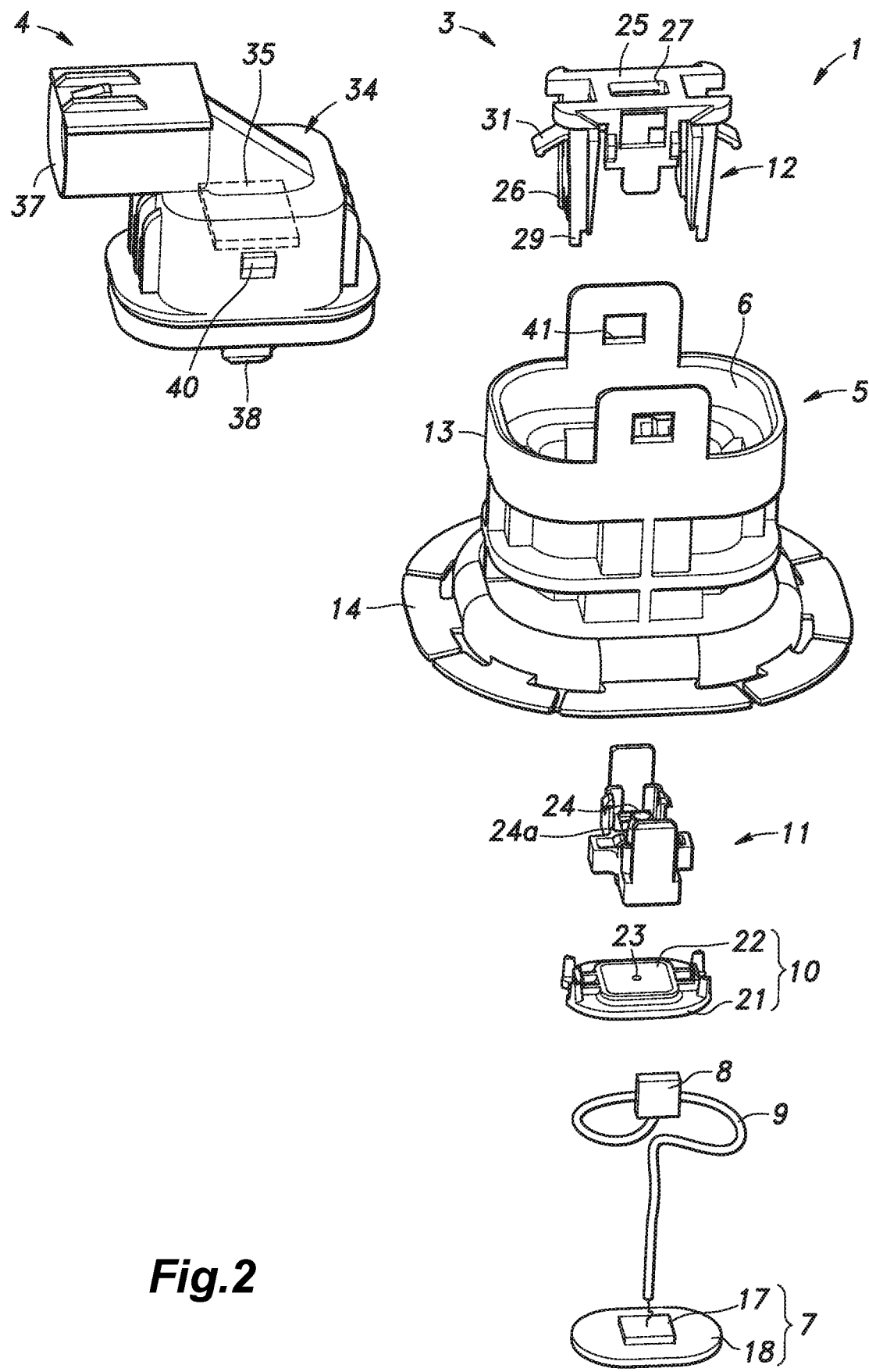
FIG. 2 is an exploded perspective view of the sensor part according to the first embodiment.

Embodiments of the present invention are described with reference to the appended drawings. FIGS. 1 and 2 are a perspective view and an exploded perspective view of a sensor part 1 according to a first embodiment of the present invention. The sensor part 1 includes a first assembly 3 fixed to a target member 2 such as a bumper of a vehicle and a second assembly 4 fixed to the first assembly 3. In the following description, the fore and aft direction, the vertical direction, and the lateral direction are defined as illustrated in the drawings. When the target member 2 is a front bumper and the sensor part 1 is mounted so as to face forward, the vertical direction in the description substantially coincides with the longitudinal direction of the vehicle. The target member 2 may consist of other types of members, and the sensor part 1 may be mounted so as to face the rear or lateral side of the vehicle.

The first assembly 3 includes a tubular first case 5 configured to be fixed to the target member 2, a vibrating member 7 retained in a hollow interior portion 6 of the tubular first case 5, and a wire harness 9 having one end electrically connected to the vibrating member 7 and another end fitted with a connector 8. The first assembly 3 further includes a sound absorbing member 10, a harness clamp 11 and a pressing member 12 having the wire harness 9 passed therethrough, which are arranged in that order from the back side of the vibrating member 7. The first assembly 3 has a generally mirror-symmetrical shape with respect to a cross sectional plane orthogonal to both the vertical direction and the lateral direction except for the wire harness 9 and the connector 8.

As shown in FIG. 1, FIG. 2 and FIG. 3, the first case 5 is provided with a tubular portion 13 having an open front end and an open rear end, and a flange-shaped fixing portion 14 formed on the front end of the tubular portion 13. The fixing portion 14 is configured to be fixed to the back surface of the target member 2 by using a double-sided adhesive tape 15. Fixing means other than the double-sided adhesive tape 15 may also be used, and such fixing means may be selected from those that do not impair the external appearance of the surface of the target member 2 such as an adhesive agent. The inner peripheral surface of the front end of the tubular portion 13 is fitted with an annular first seal member 16 (see FIG. 6) made of such elastic material as rubber that makes the interface between the target member 2 and the first case 5 watertight, and reduces the propagation of the vibration from the vibrating member 7 to the first case 5 and the outside thereof.

As shown in FIGS. 1 and 2, the vibrating member 7 includes a vibrating element 17 electrically connected to the wire harness 9, and a diaphragm 18 made of metal such as aluminum and attached to the front surface of the vibrating element 17. Before the sensor part 1 is attached to the target member 2, the vibrating member 7 is retained in the hollow interior portion 6 of the first case 5 by a temporary retaining portion consisting of a pair of temporary retaining engagement claws 19 projecting laterally from the inner surface of the tubular portion 13 toward each other. Once the sensor part 1 is attached to the target member 2, the vibrating member 7 is in close contact with the back side of the target member 2, but is not in contact with parts other than the target member 2 and the wire harness 9. When the vibrating member 7 retained by the temporary retaining engagement claws 19 is pushed forward, the temporary retaining engagement claws 19 are pushed laterally outward away from each other so that the vibrating member 7 is disengaged from the temporary retaining engagement claws 19. The part of the target member 2 to which the vibrating member 7 is fixed preferably consists of a plate or a sheet which is reduced in thickness by being formed with a recess 20 (see FIG. 6) so that the ultrasonic wave generated by the vibration of the vibrating member 7 and the reflected wave thereof can pass through without undue attenuation.

The sound absorbing member 10 is positioned behind the vibrating member 7 which is retained by the temporary retaining engagement claws 19 in the hollow interior portion 6 of the first case 5, and includes an annular support plate 21, and a sound absorbing sheet 22 supported by the support plate 21. The sound absorbing member 10 is provided with an insertion hole 23 extending in the fore and aft direction so as to pass the wire harness 9 therethrough. The sound absorbing sheet 22 attenuates the back wave radiated rearward from the vibrating member 7.

The harness clamp 11 is positioned behind the sound absorbing member 10 in the hollow interior portion 6 of the first case 5. The harness clamp 11 is provided with a grip hole 24 penetrating in the fore and aft direction and aligned with the insertion hole 23 to grip the wire harness 9 therein. The grip hole 24 is formed in a protruding portion 24a made of rubber that protrudes rearward. Once the sensor part 1 is attached to the target member 2, the position of the harness clamp 11 with respect to the vibrating member 7 is kept stable. Therefore, the part of the wire harness 9 located between the vibrating member 7 and the harness clamp 11 is slack and slightly bent so that an excessive tensile force that could break the wire harness 9 is prevented from being applied to this part of the wire harness 9.

As shown in FIGS. 1, 2 and 4, the pressing member 12 includes a top portion 25 configured to slidably move in the hollow interior portion 6 of the first case 5, and a pair of laterally opposed leg portions 26 extending forward from the top portion 25. The pressing member 12 is located in the hollow interior portion 6 of the first case 5, and the top portion 25 is located behind of the harness clamp 11. The top portion 25 is provided with an opening 27 through which the wire harness 9 is passed.

Since an outer edge portion of the support plate 21 of the sound absorbing member 10 is engaged by a pair of engagement protrusions 28 each projecting inward from a vertically central position of the front end of the corresponding leg portion 26 of the pressing member 12, and the harness clamp 11 is clamped between the sound absorbing member 10 and the pressing member 12, the sound absorbing member 10, the harness clamp 11 and the pressing member 12 are caused to jointly slide in the hollow interior portion 6 of the first case 5.

The two end portions of the front end of each leg portion 26 of the pressing member 12 with respect to the vertical direction are each provided with a gripping portion 29 consisting of a forwardly facing shoulder surface 29a and a protrusion 29b projecting forward from an outer edge of the shoulder surface 29a. Each gripping portion 29 is configured such that the shoulder surface 29a and the protrusion 29b can abut onto the rear surface and the side surface of the diaphragm 18, respectively. Further, since the length of the protrusion 29b in the fore and aft direction is equal to or less than the thickness of the diaphragm 18, the front end of the protrusion 29b is flush with or behind the front surface of the diaphragm 18 when the gripping portion 29 grips the diaphragm 18 so that the pressing of the diaphragm 18 onto the target member 2 by the pressing member 12 is not hindered.

The pressing member 12 can take an initial position where the gripping portion 29 grips the vibrating member 7 retained by the temporary retaining engagement claws 19, a pressing position where the shoulder surface 29a of the gripping portion 29 presses the vibrating member 7 against the target member 2, and a separated position where the gripping portion 29 is spaced rearward from the vibrating member 7 which is in close contact with the target member 2, in a sequential manner.

Figure 3A:
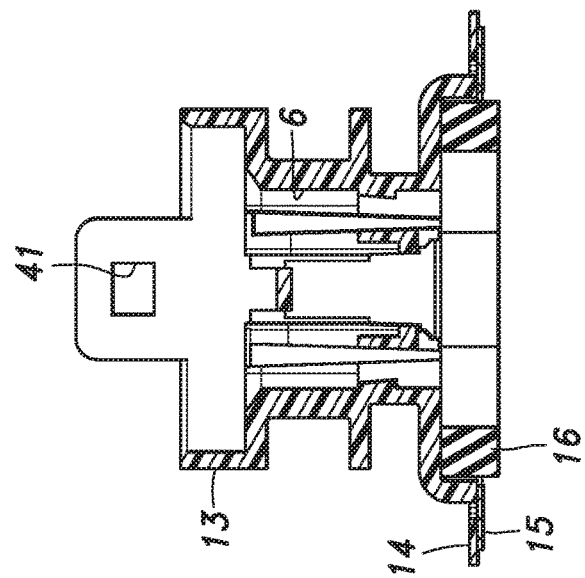
FIG. 3 shows various views of a first case of the first embodiment (A: plan view, B: sectional view taken along line B-B in FIG. 3A, C: sectional view taken along line C-C in FIG. 3A, D: sectional view taken along line D-D in FIG. 3A)
Figure 3B:
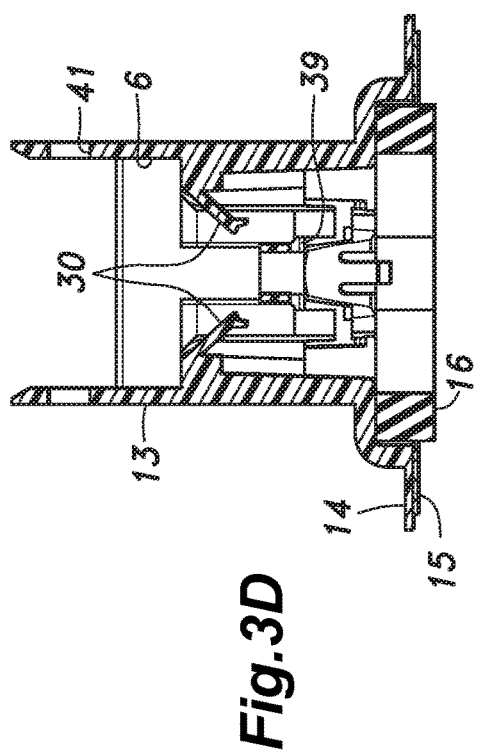
Figure 3C:
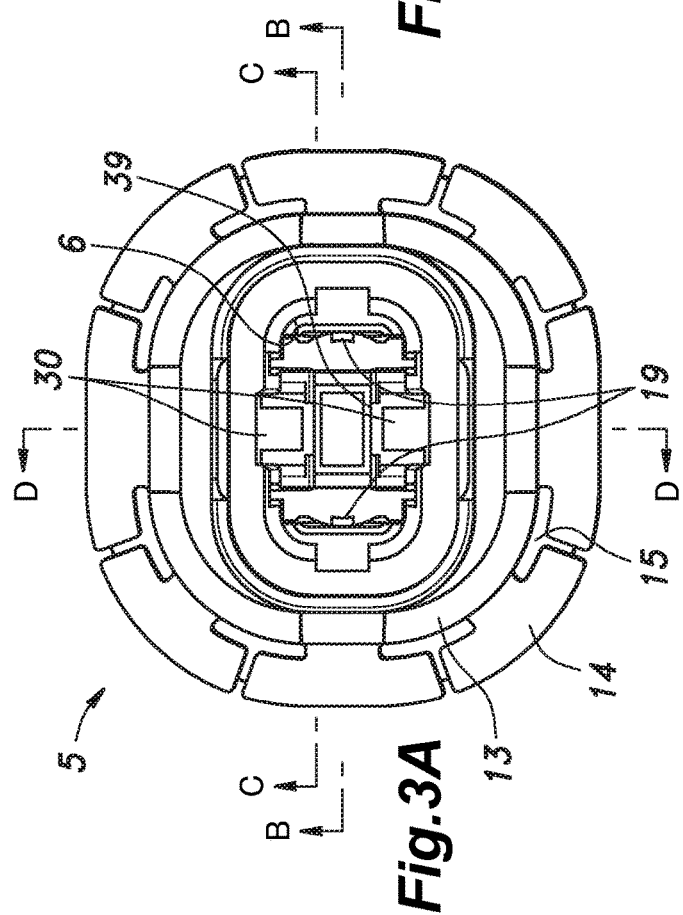
Figure 3D:
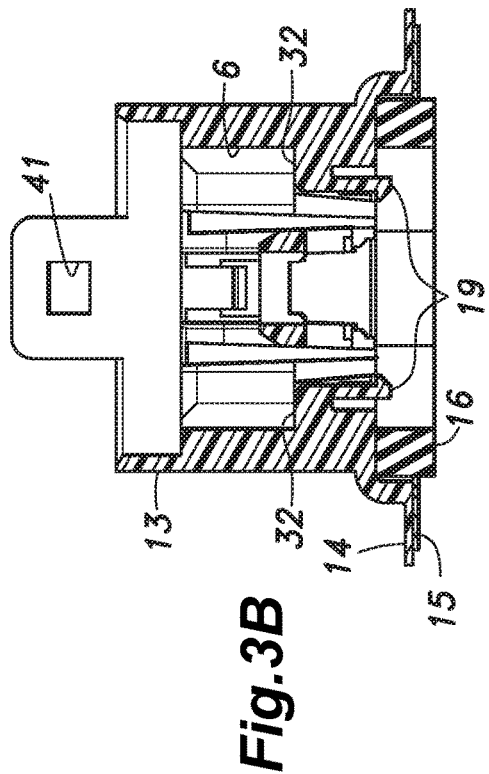
Figure 8A:
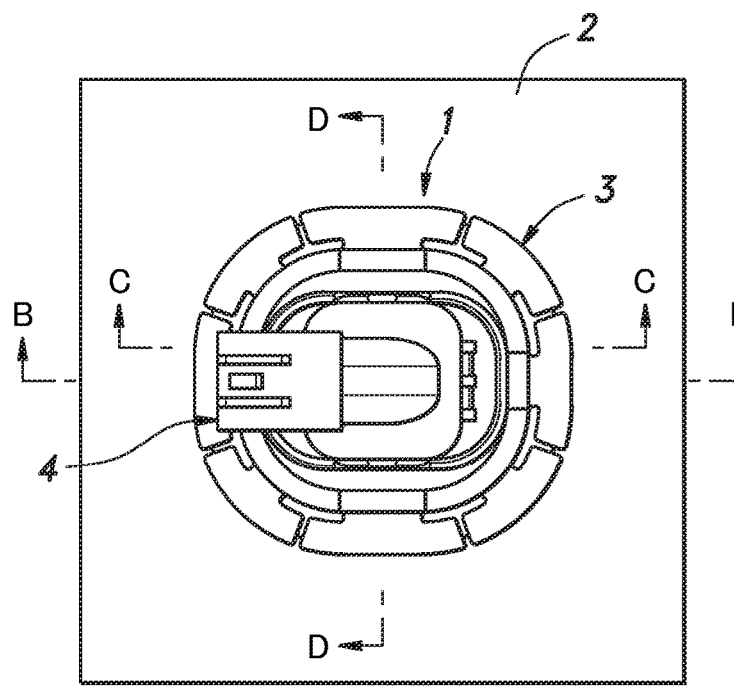
FIG. 8 shows various views illustrating the procedure for mounting the sensor part of the first embodiment (A: plan view, B: sectional view taken along line B-B in FIG. 8A, C: sectional view taken along line C-C in FIG. 8A, D: sectional view taken along line D-D in FIG. 8A)
Figure 8C:
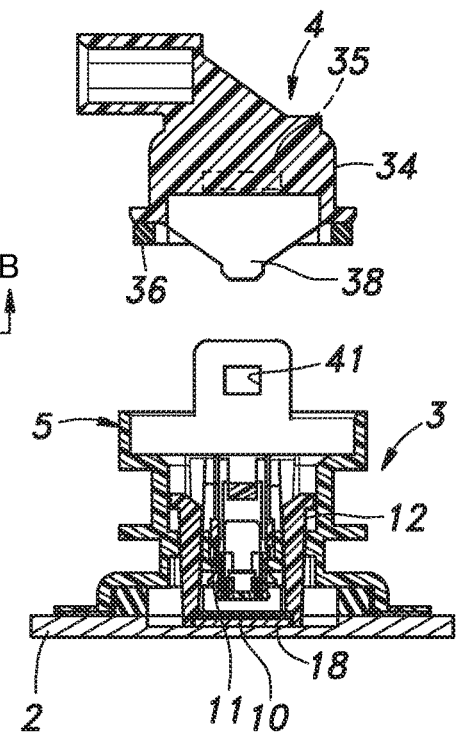
Figure 8B:
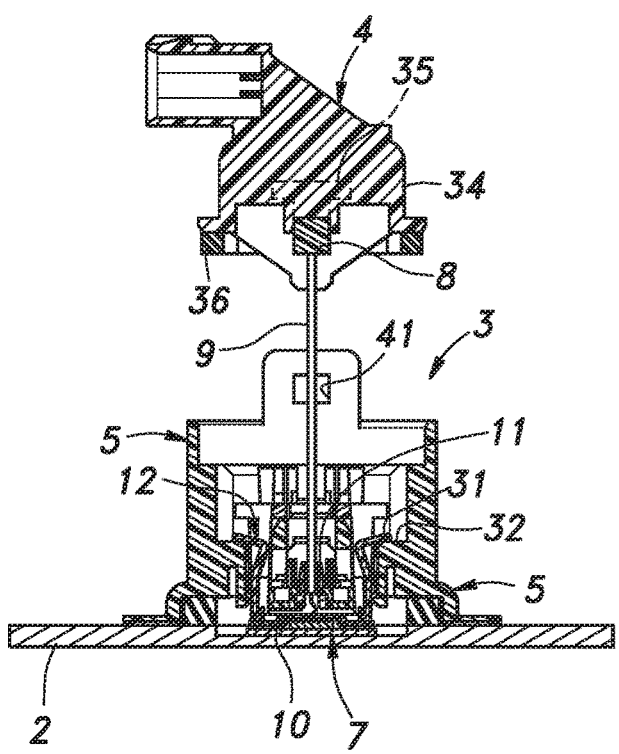
Figure 8D:
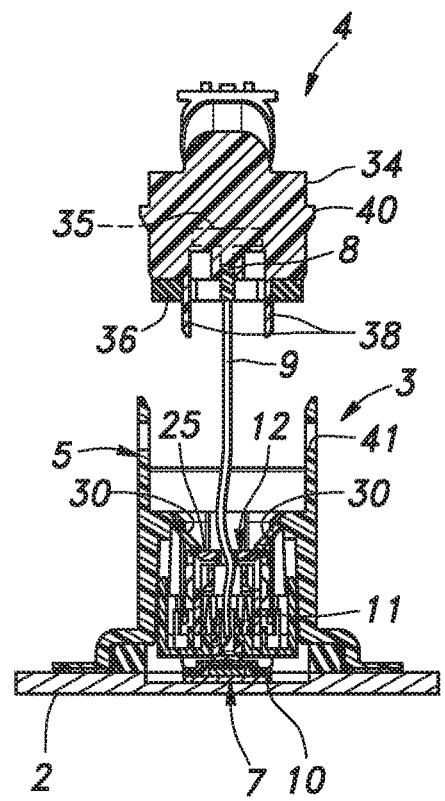
Figure 11:
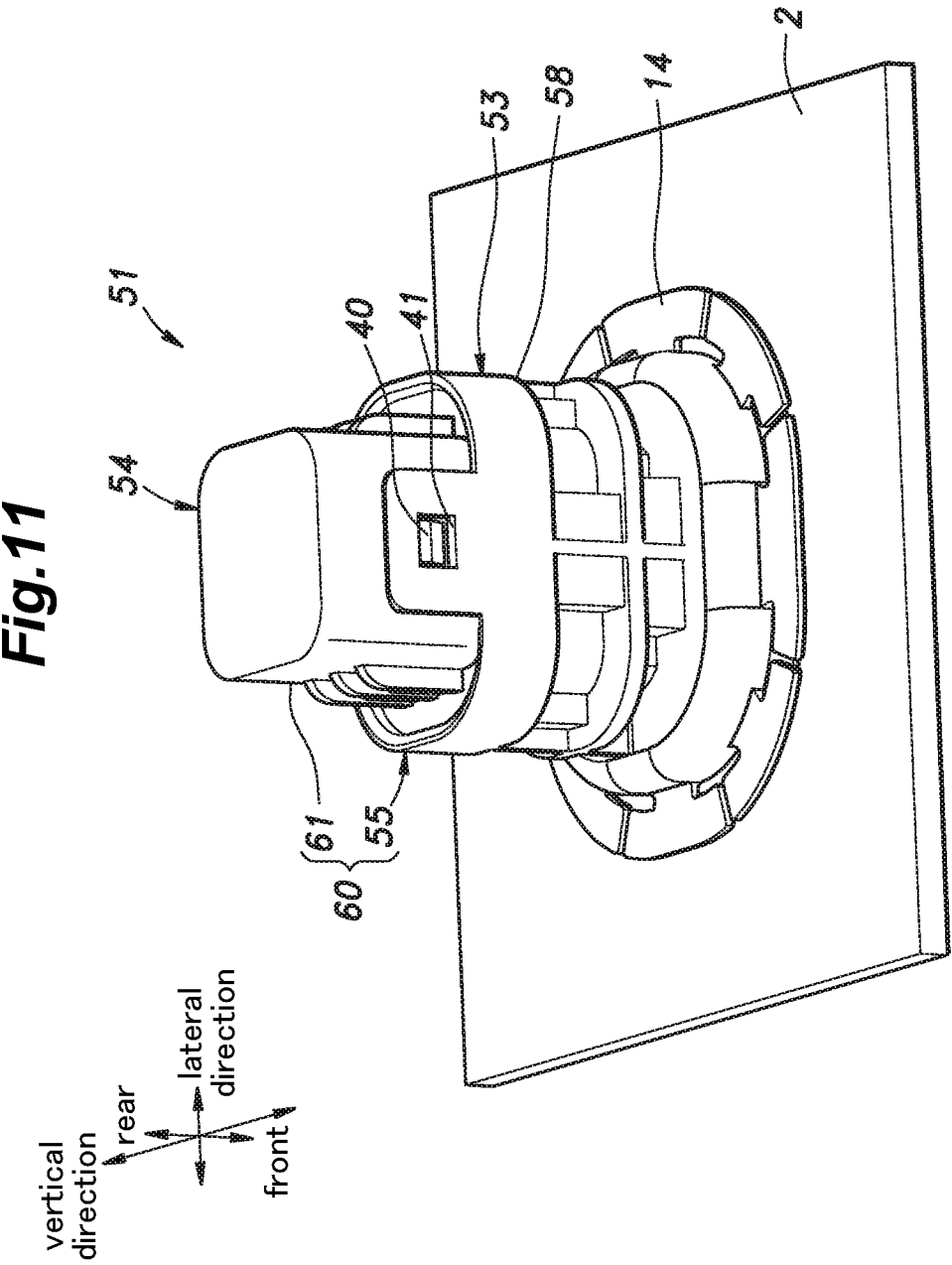
FIG. 11 is a perspective view of s sensor part according to a second embodiment of the present invention.
Figure 12:
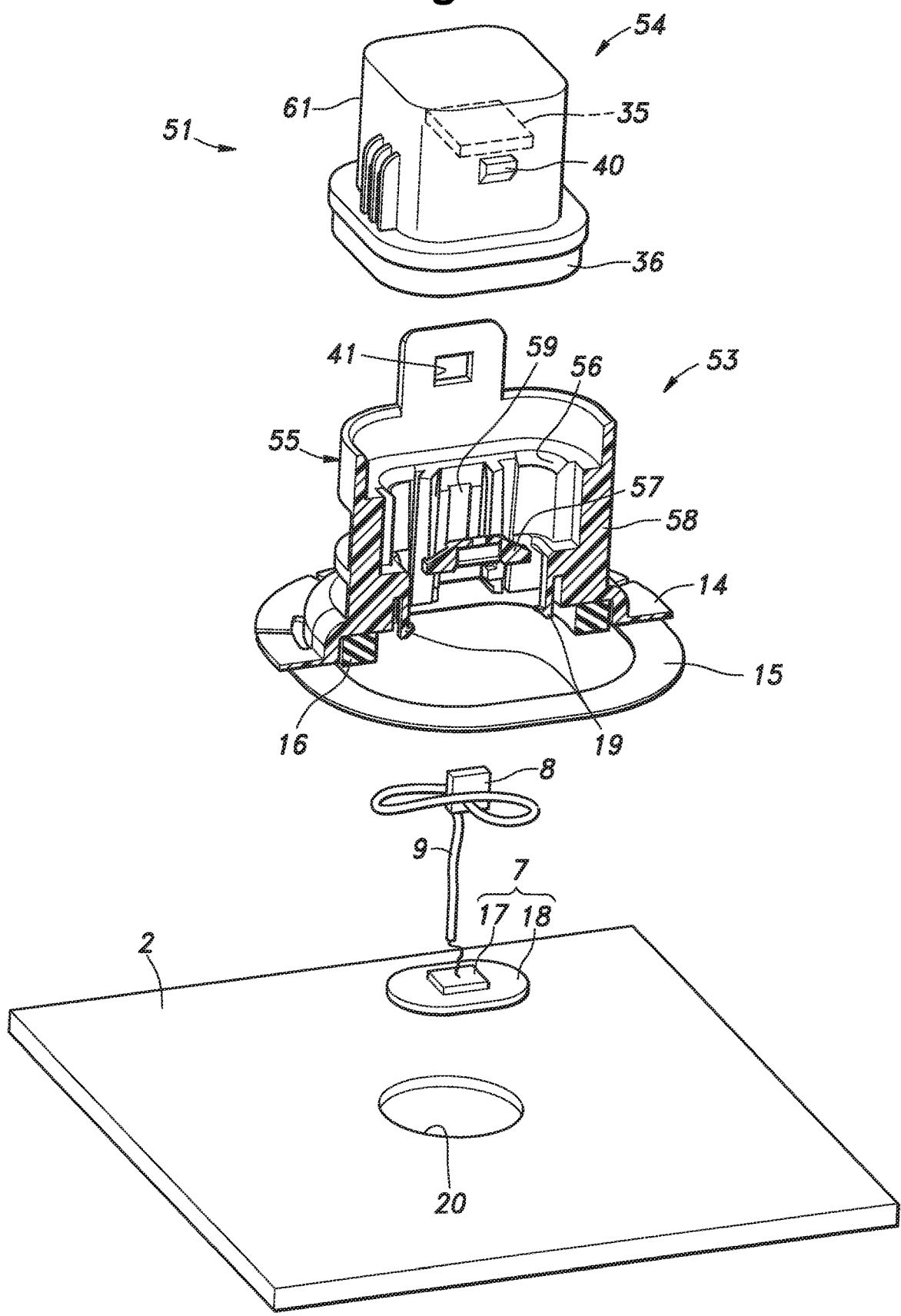
FIG. 12 is an exploded perspective view of the sensor part according to the second embodiment partly in section.

As shown in FIGS. 3D and 7D, the first case 5 is provided with a pressing engagement portion consisting of a pair of pressing engagement claws 30 projecting obliquely forward from the inner surface of the first case 5 so as to vertically oppose each other. The pressing member 12 is thereby prevented from moving rearward at the pressing position. Further, as shown in FIG. 3B, FIG. 4 and FIG. 7B, the side surface of each leg portion 26 of the pressing member 12 is provided with a biasing portion consisting of an elastic piece 31 extending rearward and then projecting in a laterally outward and forward direction from the main body of the leg portion 26 as a cantilever so as to bias the pressing member 12 rearward at the pressing position. The inner surface of the first case 5 is formed with a pair of rearward facing shoulder surfaces 32 onto which the elastic pieces 31 resiliently abut at the pressing position. The elastic pieces 31 may also be provided in the first case 5 while the shoulder surfaces 32 are provided in the pressing member 12. The biasing portion may also consist of a biasing member such as a compression coil spring or the like interposed between the first case 5 and the pressing member 12.

As shown in FIGS. 1 and 2, the second assembly 4 includes a second case 34 connected to the first case 5 so as to form a case 33 which covers the vibrating member 7 in cooperation with the first case 5, and a circuit board 35 which is supported by the second case 34 to control the vibrating member 7. The circuit board 35 is electrically connected to the vibrating member 7 via the wire harness 9 and the connector 8 connected thereto.

The annular front surface of the second case 34 is fitted with an annular second seal member 36 made of elastic material such as rubber. When the second assembly 4 is joined to the first assembly 3, the annular front surface of the second case 34 abuts on the rear surface of the tubular portion 13 of the first case 5 via the second seal member 36 so that the interface between the first case 5 and the second case 34 is kept watertight, and the propagation of vibration is also reduced. Alternatively, the second seal member 36 may be fitted to the first case 5. The rear end of the second case 34 is provided with an insertion port 37 for a power supply for supplying electricity to the circuit board 35.

Further, the front end of the second case 34 is provided with a release portion consisting of a pair of release projecting pieces 38 which are formed so as to oppose each other in the vertical direction and to project forward. The release projecting pieces 38 cause the pressing engagement claws 30 to disengage the pressing member 12 when the second case 34 is joined to the first case 5 by the action of the inclined release projections 38 sliding over the corresponding inclined surfaces of the pressing engagement claws 30 so as to push the pressing engagement claws 30 outward. Once the pressing engagement claws 30 have disengaged the pressing member 12, the pressing member 12 moves from the pressing position to the separated position under the biasing force of the elastic pieces 31. The distance between the two release projecting pieces 38 is greater than the vertical length of the top portion 25 of the pressing member 12 so that the top portion 25 can be received between the two release projecting pieces 38. In the separated position, the protruding portion 24a of the harness clamp 11 is engaged by the rear locking portion 39 (see FIG. 3) which is supported by the inner peripheral surface of the tubular portion 13 of the first case 5 and extends in the hollow interior portion 6 so that the rearward movement of the sound absorbing member 10, the harness clamp 11, and the pressing member 12 is restricted.

A pair of engagement projections 40 are provided on either side surface of the second case 34 facing in the vertical direction, and a pair of engagement holes 41 are provided on either side surface of the first case 5 each facing in the vertical direction and configured to receive the corresponding engagement projection 40. The second case 34 is joined to the first case 5 by engaging the engagement projections 40 with the respective engagement holes 41.

The material of the first case 5, the support plate 21 of the sound absorbing member 10, the main body of the harness clamp 11, the pressing member 12 and the second case 34 is preferably resin.

The process of attaching the sensor part 1 to the target member 2 is described in the following with reference to FIGS. 5 to 10.

The first assembly 3 and the second assembly 4 are each placed in an assembled state. In the first assembly 3, the vibrating member 7 is retained by the temporary retaining engagement claws 19, and the pressing member 12 is positioned in the initial position. The worker applies a thermosetting adhesive to the front surface of the diaphragm 18 and then fixes the fixing portion 14 of the first case 5 to the target member 2 with a double-sided adhesive tape 15, thereby mounting the first assembly 3 to the target member 2 (ST11, FIG. 6). In mounting the first assembly 3 to the target member 2, a ring-shaped member 42 covering the whole or a part of the flange-shaped fixing portion 14 from above is preferably provided as shown in FIGS. 6B to 6D. The ring-shaped member 42 is set in advance to the first assembly 3, and the flange-shaped fixing portion 14 is pressed against the target member 2 via the ring-shaped member 42. In this way, the contact pressure load of the double-sided adhesive tape 15 on the target member 2 can be made uniform, and the first assembly 3 can be mounted at the predetermined position with a minimum error in the mounting position including the vertical positioning. Also, by doing so, the attachment strength of the first assembly 3 can be made uniform, and the sealing performance of the annular first seal member 16 can be maximized.

The worker then pushes the pressing member 12 positioned at the initial position forward (ST12, FIG. 7). At this time, by being pushed forward by the pressing member 12, the vibrating member 7 spreads the temporary retaining engagement claws 19 outward so that the vibrating member 7 is released from the engagement by the temporary retaining engagement claws 19, and is allowed to move. As a result, the pressing member 12 moves to the pressing position. Upon reaching the pressing position, the pressing member 12 is engaged by the pressing engagement claws 30 at the top portion 25 thereof so that the diaphragm 18 is kept pushed against the recess 20 of the target member 2.

Thereafter, the worker thermally cures the adhesive to bring the diaphragm 18 into close contact with the target member 2 (ST13). For example, the target member 2 and the first assembly 3 may be heated in a coating oven so as to thermally cure the adhesive.

Then, the worker connects the connector 8 to the second assembly 4 so as to electrically connect the circuit board 35 with the vibrating member 7 (ST14, FIG. 8).

Then, the worker moves the second assembly 4 forward so that the engagement projections 40 of the second case 34 are fitted into the respective engagement holes 41 of the first case 5, and the second assembly 4 is thereby secured to the first assembly 3 (ST15). At this time, the release projecting pieces 38 provided at the front end of the second case 34 push the pressing engagement claws 30 which have been engaging the top portion 25 of the pressing member 12 outward, and thereby release the engagement (FIG. 9). As a result, the pressing member 12 which has been biased rearward by the elastic pieces 31 is caused to move rearward to the separated position since the biasing force of the elastic pieces 31 overcomes the frictional force acting between the gripping portion 29 of the pressing member 12 and the diaphragm 18 (FIG. 10). A certain excess length is required for the wire harness 9 upon completion of the assembly work in order to increase the efficiency of the assembly work in connecting the connector 8 to the wire harness 9 in ST14, and such an excess length of the wire harness 9 can be accommodated in the case 33.

Thus, once the sensor part 1 is attached to the target member 2, the positions of the vibrating member 7 and the second assembly 4 are determined by the positioning the first case 5. Therefore, it is not necessary to position multiple members individually so that the mounting operation is both simple and efficient. In addition, if a plurality of members are fixed at the same time, the reliability of the fixation tends to be reduced. However, in the present embodiment, since the diaphragm 18 is attached to the target member 2 after the first case 5 temporarily retaining the vibrating member 7 is attached so that the attaching work can be performed in a reliable manner in both cases.

Following the mounting of the sensor part 1, the pressing member 12 is separated from the vibrating member 7 in order not to interfere with the vibration of the vibrating member 7. Since this operation is performed in conjunction with the attachment of the second assembly 4 to the first assembly 3, the work efficiency can be improved.

Since the circuit board 35 is provided in the second assembly 4 and the second assembly 4 is attached to the first assembly 3 after the heat treatment for bringing the diaphragm 18 into close contact with the target member 2, the circuit board 35 which may be relatively vulnerable to heat is not heated during the process of heating the target member 2 and the entire first assembly 3. Further, providing the circuit board 35 in the second assembly 4 reduces the influence of the vibration of the vibrating member 7 on the circuit board 35.

Since the inside of the case 33 is kept watertight owing to the first seal member 16 and the second seal member 36, the electrical connection of the wire harness 9 to the vibrating element 17 of the vibrating member 7 and the electric connection of the connector 8 to the circuit board 35 are protected. Further, the circuit board 35 supported by the second case 34 is protected from vibration since the propagation of the vibration from the vibrating member 7 is insulated by the first seal member 16 and the second seal member 36, and the wire harness 9 connected between the vibrating member 7 and the circuit board 35 is provided with a bent portion or a slack.

A second embodiment according to the present invention is described in the following with reference to FIG. 11 to FIG. 14. In the following disclosure, the parts corresponding to those of the first embodiment are denoted with like numerals without necessarily repeating the description of such parts. The sensor part 51 of the second embodiment differs from the sensor part 51 of the first embodiment in that the vibrating member 7 is temporarily retained by a heating jig 52 when being pressed against the target member 2.

The sensor part 51 is provided with a first assembly 53 fixed to the target member 2 such as a bumper of a vehicle and a second assembly 54 fixed to the first assembly 53.

The first assembly 53 includes a tubular first case 55 fixed to the target member 2, a vibrating member 7 retained in a hollow interior portion 56 of the tubular first case 5, a wire harness 9 having one end electrically connected to the vibrating member 7 and another end fitted with a connector 8, and a harness clamp 11 positioned behind the vibrating member 7. The first assembly 53 has a generally mirror-symmetrical shape with respect to a sectional plane perpendicular to both the vertical direction and the lateral direction except for the wire harness 9 and the connector 8, The first case 55 has a tubular portion 58 having an open front end and an open rear end, and a flange-shaped fixing portion 14 formed on the front end of the tubular portion 58. The fixing portion 14 is fixed to the back surface of the target member 2 by a double-sided adhesive tape 15. A first seal member 16 is attached to the inner peripheral surface of the front end of the tubular portion 58 similarly as in the first embodiment.

The vibrating member 7 is positioned in the hollow interior portion 56 of the tubular portion 58, and similarly as in the first embodiment, is retained by a temporary retaining portion consisting of a pair of temporary retaining engagement claws 19 provided on the inner surface of the tubular portion 58 of the first case 55.

The harness clamp 57 consists of a plate member having a grip hole 24 for gripping the wire harness 9. The harness clamp 11 is inserted from the rear along a pair of guide grooves 59 extending in the vertical direction and provided on mutually opposing parts of the inner peripheral surface of the tubular portion 58. The harness clamp 11 is engaged by the front ends of the guide grooves 59, and is prevented from moving rearward owing to frictional force. The two lateral ends of the harness clamp 57 are separated from the inner circumferential surface of the tubular portion 58 so that the heating jig 52 can be inserted to the front of the hollow interior portion 56.

The second assembly 54 includes a second case 61 which is joined to the first case 55 so as to form a case 60 covering the vibrating member 7 jointly with the first case 55, and a circuit board 35 supported by the second case 61 and configured to control the vibrating member 7.

An annular second seal member 36 is attached to the front end of the second case 61. The second case 34 is provided with an insertion port (not shown in the drawings) for supplying electric power to the circuit board 35.

A pair of engagement projections 40 provided on either side surface of the second case 61 facing in the vertical direction are engaged by a pair of engagement holes 41 on the respective side surfaces of the first case 5 facing in the vertical direction so that the second case 61 is connected to the first case 55. Thereby, the second assembly 54 is joined to the first assembly 53.

Figure 13:
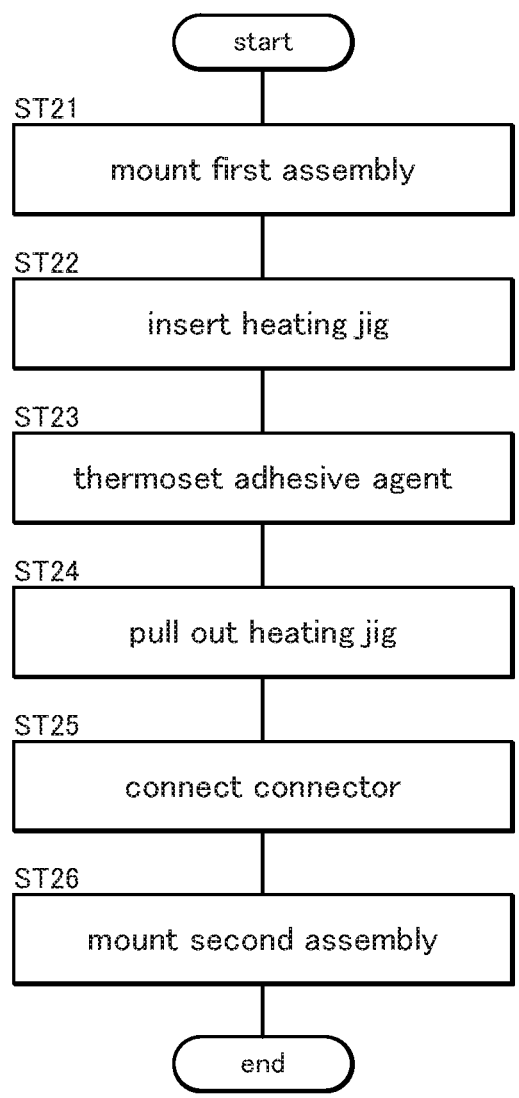
FIG. 13 is a flowchart showing a procedure for mounting the sensor part of the second embodiment.
Figure 14:
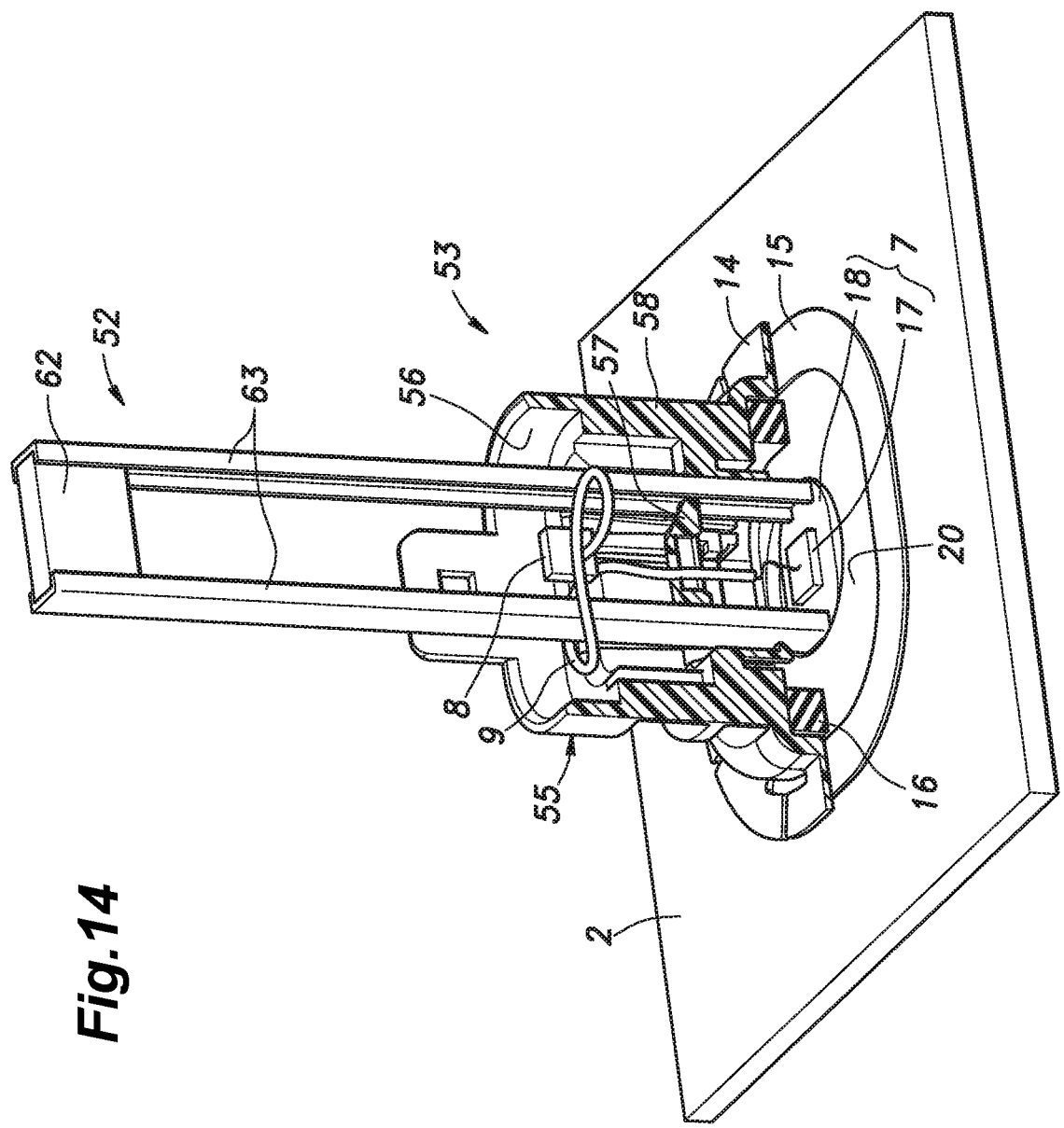
FIG. 14 is a partial cross-sectional perspective view showing a procedure for mounting the sensor part of the second embodiment.

A process of attaching the sensor part 51 to the target member 2 is described in the following with reference to FIGS. 13 and 14. The heating jig 52 is made of a material having a high thermal conductivity such as metal, and has a rod-shaped or block-shaped heating portion 62 and a pair of leg portions 63 extending from either end of the heating portion 62.

The first assembly 53 and the second assembly 54 are placed in an assembled state. In the first assembly 53, the temporary retaining engagement claws 19 retain the vibrating member 7. The worker applies a thermosetting adhesive to the front surface of the diaphragm 18, and then fixes the fixing portion 14 of the first case 5 to the target member 2 by using a double-sided adhesive tape 15, thereby mounting the first assembly 3 to the target member 2 (ST21).

The worker then inserts the front ends of the leg portions 63 of the heating jig 52 into the hollow interior portion 56 of the tubular portion 58 from the side of the rear end (ST22). As the leg portions 63 push the diaphragm 18 forward, the retention of the vibrating member 7 by the temporary retaining engagement claws 19 is released with the result that the vibrating member 7 is pressed against the target member 2 by the leg portions 63.

The heating portion 62 is heated, and the diaphragm 18 is heated via the leg portions 63 to heat and cure the adhesive agent with the result that the diaphragm 18 is brought into close contact with the target member 2 (ST23).

Thereafter, the worker pulls out the heating jig 52 (ST24), and connects the connector 8 to the second assembly 54 to electrically connect the vibrating member 7 to the circuit board 35 (ST25).

The worker then moves the second assembly 54 forward until the engagement projections 40 of the second case 61 fit into the respective engagement holes 41 of the first case 55 so that the second assembly 54 is attached to the first assembly 53 (ST26).

In the second embodiment also, only the first case 55 is required to be positioned. Since the fixing of the first case 55 and the fixing of the diaphragm 18 are performed separately, the mounting operation is both simple and efficient, and the case 55 and the diaphragm 18 can be mounted in a reliable manner. Further, the component structure of the sensor assembly 51 is more simplified than that of the first embodiment.

The present invention has been described in terms of specific embodiments, but is not limited by such embodiments, and can be modified in various ways without departing from the scope of the present invention. For example, in regard to the first case, the temporary retaining engagement claws that form the temporary retaining portion may be positioned more forward than the fixing portion, and after the diaphragm is positioned and fixed to the target member, the first case may be pushed forward to release the temporary engagement, and then secured to the target member. The bonding of the diaphragm to the target member may be performed with any other bonding means such as an adhesive agent of a type other than a thermosetting type. The temporary retaining portion, the biasing portion, the pressing engagement portion and the releasing portion for the pressing engagement portion may also each consist of three or more claws or pieces, instead of a pair of claws or pieces. The contents of the base application on which the Convention priority claim for the present invention is made, and the contents of any prior art mentioned in the present invention are incorporated into the present application by reference.

GLOSSARY OF TERMS

| | |
|---|---|
| 1, 51: sensor part | 2: target member |
| 3, 53: first assembly | 4, 54: second assembly |
| 5, 55: first case | 6: hollow interior portion |
| 7: vibrating member | 9: wire harness |
| 10: sound absorbing member | 11: harness clamp |
| 12: pressing member | 14: fixing portion |
| 16: first seal member | |
| 9: temporary retaining engagement claw (temporary retaining portion) | |
| 30: pressing locking claw (pressure locking portion) | |
| 31: elastic piece (biasing portion) | 32: shoulder surface |
| 33, 60: case | 34, 61: second case |
| 35: circuit board | 36: second seal member |
| 38: release projecting piece (release portion) | |

The invention claimed is:

1. A sensor part including a vibrating member to be brought into close contact with a target member, and a case for at least partly covering the vibrating member, the sensor part further comprising:
   a first assembly provided with the vibrating member, and a first case forming at least a part of a case, and having a temporary retaining portion configured to retain the vibrating member in a selectively releasable manner, and a fixing portion configured to be fixed to the target member; and
   a second assembly provided with a circuit board electrically connectable to the vibrating member to control the vibrating member,
   wherein the temporary retaining portion is configured to be able to release the vibrating member from the engagement when the vibrating member is brought into close contact with the target member.

2. The sensor part according to claim 1, wherein
   the first case includes a tubular member having two open ends and formed with the fixing portion at one of the ends thereof, and
   the vibrating member is positioned in a hollow interior portion of the first case by the temporary retaining portion formed on an inner surface of the first case.

3. The sensor part according to claim 2, wherein the first assembly further includes a pressing member positioned in the tubular hollow interior portion of the first case so as to be slidable in an axial direction of the first case, the pressing member being moveable from a pressing position where the vibrating member when released from the temporary retaining portion is pressed against the target member with a prescribed pressure to a separated position where the pressing member is spaced from the vibrating member.

4. The sensor part according to claim 3, wherein the first case is provided with a pressing engagement portion for engaging the pressing member at the pressing position in a selectively releasable manner, and wherein the pressing member is provided with a biasing portion for biasing the pressing member engaged by the pressing engagement portion toward the separated position.

5. The sensor part according to claim 4, wherein the second assembly further includes a second case supporting the circuit board and configured to be joined to the first case to form the case in cooperation with the first case,
   the pressing engagement portion includes a pressing engagement claw projecting from an inner surface of the first case to engage the first pressing portion, and
   the second case is provided with a release portion configured to push the pressing engagement claw outward so as to release the pressing member from the pressing engagement claw when the second case is joined to the first case.

6. The sensor part according to claim 5, wherein the second case closes the other end of the first case.

7. The sensor part according to claim 6, wherein the first case is provided with a first seal member having a resiliency and extending along the fixing portion to be interposed between the first case and the target member when the first case is fixed to the target member, and the first case or the second case is provided with a second seal member having a resiliency and extending along a joining face of the first case or the second case to be interposed between the first case and the second case when the second case is connected to the first case.

8. The sensor part according to claim 1, wherein the first assembly includes a wire harness connected to the vibrating member and configured to be connected to the circuit board.

9. A method for mounting a sensor part including
   a first assembly provided with a vibrating member configured to be brought into close contact with a target member, and a first case having a temporary retaining portion configured to retain the vibrating member in a selectively releasable manner, and a fixing portion configured to the fixed to the target member; and
   a second assembly provided with a second case configured to be connected to the first case to form a case in cooperation with the first case, and a circuit board electrically connectable to the vibrating member to control the vibrating member;
   wherein the temporary retaining portion is configured to be able to release the vibrating member from the engagement when the vibrating member is brought into close contact with the target member,
   the method comprising the steps of:
      attaching the first assembly to the target member by fixing the first case to the target member;
      releasing the vibrating member from the temporary retaining portion to be pressed against the target member;
      bringing the vibrating member into a close contact with the target member;
      electrically connecting the vibrating member to the circuit board; and
      joining the second assembly to the first assembly by connecting the second case to the first case.

10. The mounting method according to claim 9, wherein
    the first case is tubular in shape and has two open ends,
    the temporary retaining portion is formed on an inner surface of the first case,
    the first assembly further includes a pressing member supported by the first case so as to be slidable in an axial direction of the first case,
    the pressing member is movable from an initial position to a pressing position where the vibrating member released from the temporary retaining portion is pressed against the target member with a prescribed pressure, and to a separated position where the pressing member is spaced from the vibrating member, in a sequential manner,
    the pressing member is biased away from the vibrating member at the pressing position, and engaged by a pressing engagement claw projecting from an inner surface of the first case so as to prevent a movement of the pressing member away from the vibrating member,
    the pressing step includes pushing the pressing member to move from the initial position to the pressing position, and
    the step of joining the second assembly to the first assembly includes moving the pressing member from the pressing position to the separated position by causing a release portion provided on the second case to push the pressing engagement claw outward so as to disengage the pressing member from the pressing engagement claw when the second case is being connected to the first case.

11. The mounting method according to claim 9, wherein
    the first case is tubular in shape and has two open ends,
    the vibrating member retained by the temporary retaining portion is located in a hollow interior portion of the first case, and the pressing step includes inserting a jig into the hollow interior portion of the first case to push out the vibrating member to be disengaged from the temporary retaining portion and pressed against the target member.

12. The mounting method according to claim 11, wherein the step of bringing the vibrating member into a close contact with the target member includes heating a thermosetting resin interposed between the vibrating member and the target member via the jig, and pulling out the jig after thermosetting the thermosetting resin.

* * * * *